United States Patent [19]

Nielsen

[11] 3,974,858

[45] Aug. 17, 1976

[54] REGULATION VALVES

[75] Inventor: Ove Hjortborg Nielsen, Langaa Hesselager, Denmark

[73] Assignee: A/S Dansk Metal- & Armaturindustri, Denmark

[22] Filed: Mar. 4, 1974

[21] Appl. No.: 447,815

[30] Foreign Application Priority Data

Mar. 12, 1973 United Kingdom............... 11760/73

[52] U.S. Cl............................ 137/606; 137/636.1; 251/7
[51] Int. Cl.².......................................... F16K 19/00
[58] Field of Search ........ 137/606, 607, 636, 636.1, 137/636.2, 636.3, 636.4, 801

[56] References Cited
UNITED STATES PATENTS

| | | | |
|---|---|---|---|
| 2,495,395 | 1/1950 | Tweedale......................... | 137/636.1 |
| 3,586,053 | 6/1971 | Browning......................... | 137/636.4 |
| 3,861,421 | 1/1975 | Thompson....................... | 137/636.4 |

*Primary Examiner*—Robert G. Nilson
*Attorney, Agent, or Firm*—Craig & Antonelli

[57] ABSTRACT

A regulating valve such as especially a water tap or mixing valve, having an inlet passage and an outlet passage and a valve passage located therebetween, the cross sectional area of said valve passage being adjustable by means of movable valve actuation member, the valve passage being shaped as an elongated slot in the wall of the inlet passage, extending generally in the axial direction of the passage, and the slot being formed between opposed edges which are operatively connected with the valve actuation member so as to be mutually substantially parallelly displaceable towards and away from each other, whereby the valve can be made as a low noise valve with small space requirements. The invention provides for a mixing valve in which the individual valves for cold and hot water, respectively, can be located in a common elastomeric member very close to each other and even mounted in a narrow cartridge held in a valve housing in an easily replaceable manner. Furthermore the operation handles of the regulating valve may be located at the top of the valve housing so as to be easily accessible during normal use, despite their associated valve spindles being mounted with small mutual spacing.

12 Claims, 10 Drawing Figures

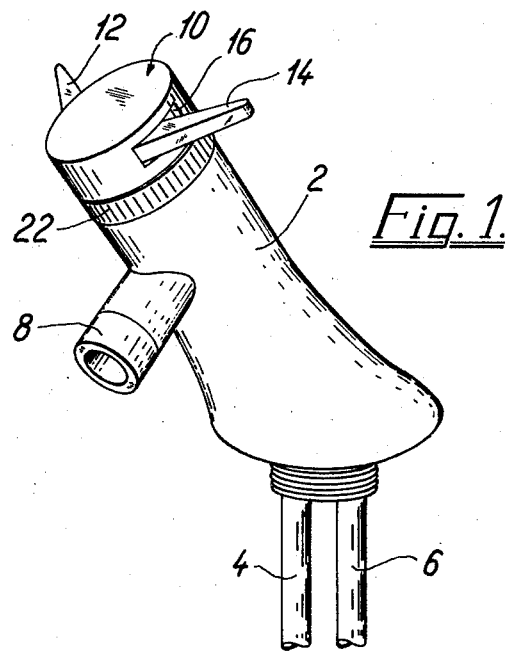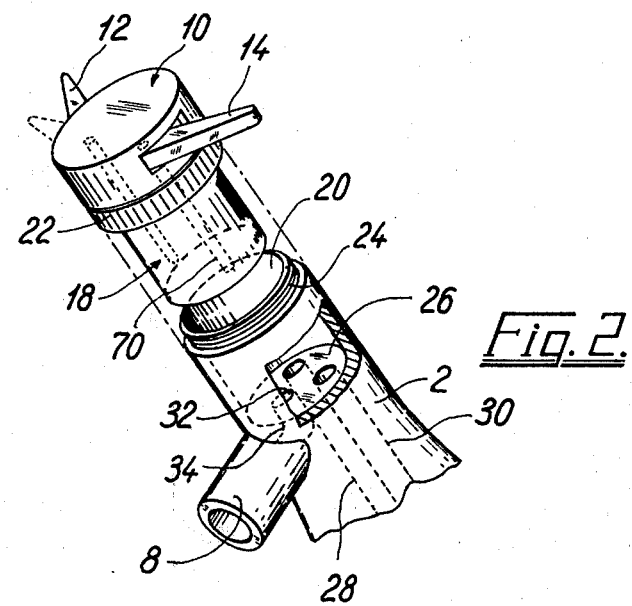

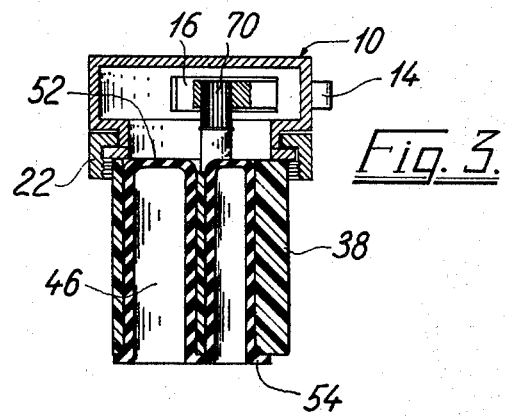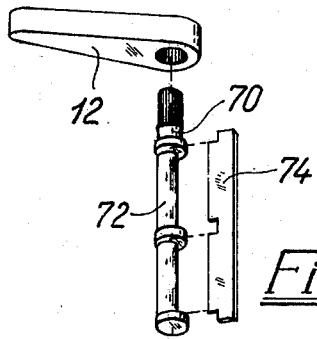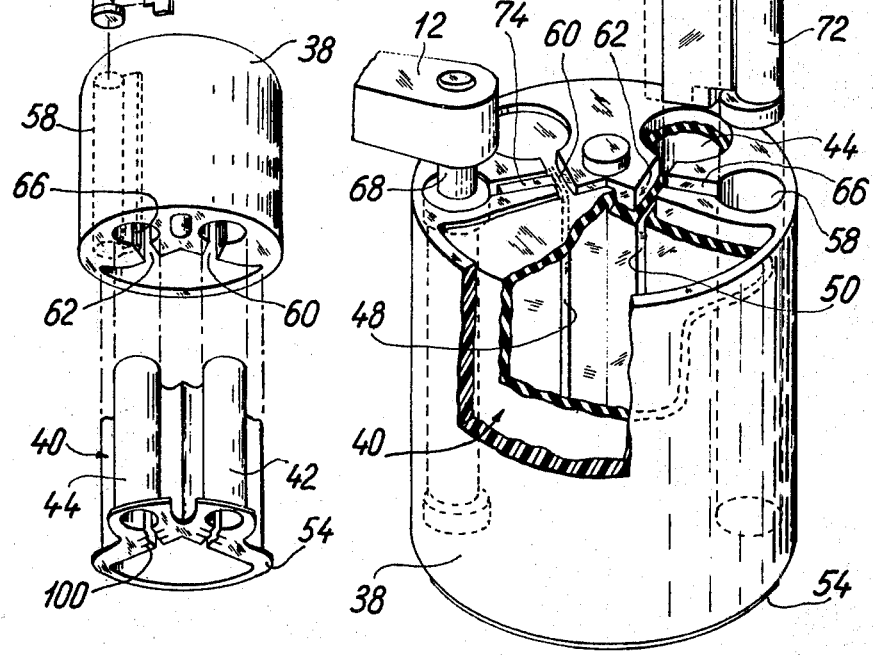

REGULATION VALVES

The present invention relates to an adjustable valve such as especially a water tap or faucet, having an inlet passage and an outlet passage and a valve passage located therebetween, the cross sectional area of said valve passage being adjustable by means of a movable valve actuation member.

In many known valves the valve passage is formed between the end of the inlet passage and a valve member cooperating with this passage end so as to be gradually retractable therefrom in order to open for the inflow to the outlet passage which may in its turn be connected to an outlet spout. In valves of the cock type the valve member is placed laterally displaceably relatively to the end or mouth of the inlet passage, whereby an edge of the valve member or of an opening therein is movable for exposing a greater or smaller area of the inlet mouth. In both cases the extension of the valve passage is limited by the cross dimension of the inlet passage, vis. either as an annular slot outside the mouth of the inlet passage or as a transverse slot across this mouth, respectively, i.e. with the largest length of the slot given by the diameter of the inlet passage.

As well known the passage of water through a valve gives rise to certain noise problems which are due to the release of the water pressure energy in the concentration area of the valve passage or valve seat. Generally the noise will be higher the more concentrated this area is, e.g. by letting out the water from a pipe end to one side thereof rather than to all sides along or across the entire periphery of the pipe end. In the latter case a relatively low energy will be released per length unit of the valve slot passage, and consequently the resulting noise from the entire area will be reduced.

However, such low noise valve tend to be voluminous because there should be a relatively large space all the way around the pipe end for receiving the outlet water, and especially in mixing valves in which it is desired to use two valves located side by side it is customary to place the valves in separate housings at either side of the outlet spout.

It is the purpose of this invention to provide a valve in which the length of the valve slot can be large compared to the diameter of the inlet passage and which is nevertheless well suited for use in compact surroundings.

According to the invention the said valve passage is shaped as an elongated slot in the wall of the inlet passage, extending generally in the axial direction of this passage, the slot being formed between opposed edges which are operatively connected with the valve actuator member so as to be mutually substantially parallelly displaceable towards and away from each other. Hereby the length of the slot can be chosen completely independently of the diameter of the inlet passage, and the slot can be long enough, therefore, to condition a wide extension of the noise source, whereby the total noise is reduced for a given total flow through the valve. Especially for a low degree of valve opening it is important that the slot edges extend substantially parallel to each other in order to ensure an even distribution of the water flow all over the length of the slot. Thus the water may leave the inlet conduit to one side only whereby the space requirements in the cross direction will be small.

The valve construction itself need not be complicated, because the inlet passage and the outlet passage may simply extend parallel to each other along a common length in which the valve passage is provided. As will appear from the following the valve is well suited to be made in such a manner that both the inlet and outlet passages as well as the valve passage are provided in a unitary elastomeric member, whereby the sealing problems are reduced to an easy sealing between the outer openings of the inlet and outlet passages and the ends of corresponding inlet and outlet bores in a rigid valve housing receiving the elastomeric member in a cartridge like manner. Preferably the elastomeric member is enclosed within a holding body in which also the valve actuator means are mounted, whereby this unit may constitute a cartridge to be replaced as a whole in case of a valve failure. The valve is well suited to be made as a mixing valve because the two individual valves therein can be arranged in very close relationship and thus be contained in a common non-voluminous valve housing.

It is a further purpose of the invention, therefore, to provide a mixing valve in which the regulation valves for cold and hot water, respectively, can be placed in a common, narrow valve housing, and still a further purpose is to provide such a mixing valve in which the operation handles of the two valves, despite their close relationship, are easy to operate even by finger tip operation.

A further important object of the invention is to provide a mixing valve in which the individual valve means are located in a unitary valve cartridge mountable in a replaceable manner adjacent the top of the valve housing.

Still a further purpose of the invention is to provide a regulation valve or a mixing valve which is simple in construction and reliable in operation.

These and other objects and advantages of the invention will appear from the following description, reference being made to the accompanying drawing, in which:

FIG. 1 is a perspective view of a mixing valve according to the invention,

FIG. 2 is a partly exploded view thereof,

FIG. 3 is a sectional view of the said cartridge,

FIG. 4 is an exploded perspective view of the cartridge, shown from below,

FIG. 5 is a perspective, partly sectional top view of the cartridge,

FIG. 6A is a partial cross-sectional view of the cartridge of FIG. 6 with a modified actuator.

Figure 6:
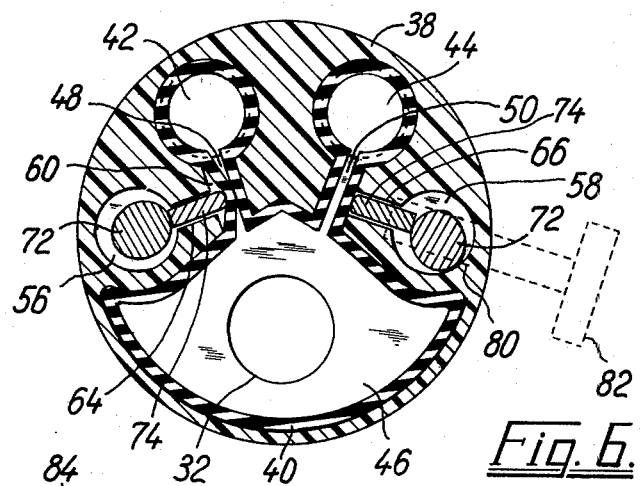
FIG. 6 is a cross sectional view of the cartridge.

The mixing valve shown in FIGS. 1–6 comprises a rigid valve housing 2 having inlet pipes 4 and 6 for cold and hot water, respectively, an outlet spout 8, and a top cover 10 from which a pair of handle levers 12 and 14 project radially through slots 16 at opposite sides of the top cover. As shown in FIG. 2 the top cover belongs to a valve cartridge 18 which is inserted in an upper cavity 20 in the valve housing 2 and fastened in its mounted position by means of a coupling nut 22 cooperating with a threaded top portion 24 of the valve housing, whereby the lower end of the cartridge is pressed against the bottom surface 26 of the cavity 20. The top cover 10 may be glued or welded to the top side of the lower portion of the cartridge by intermediate of a ring member having a protruding outer edge with which the coupling nut 22 engages. The pipes 4 and 6 are connected to bores 28 and 30, respectively, which are open to the cavity 20 through holes in the bottom thereof. A third hole 32 in the bottom 26 is connected to the spout 8 through a channel 34.

Briefly, the lower end of the cartridge 18 is provided with holes communicating with the holes in the bottom surface 26 and with valve means inside the cartridge in such a manner that the handles 12 and 14 may be used for giving graduated access of cold and hot water, respectively, to the outlet spout 8.

FIGS. 3-6 show further details of the cartridge, though the top portion 10, 22 thereof is shown in FIG. 3 only. It comprises an outer holding member or housing 38 made e.g. of a suitably hard plastics and an insert body 40 of an elastomeric material, in the following referred to as the rubber body. This body is of a generally cylindric shape, profiled so as to define parallel internal channels extending in axial alignment with the three holes in the bottom 26 of the cavity 20, i.e. two inlet channels 42 and 44 for communicating with the bores 28 and 30, respectively, and a wider outlet channel 46 for communicating with the outlet hole 32. The rubber body 40 is profiled with wall portions confining a narrow passage 48 between the channels 42 and 46 and a narrow passage 50 between the channels 44 and 46, these passages extending in a slot like manner along the entire axial length of the rubber body. At its top end the rubber body is closed by means of an integral top wall portion 52, and at its lower end it is provided with integral flange portions 54 projecting radially from the lower edges of the said channels in the rubber body, whereby these flange portions serve as sealing means when the cartridge is pressed against the bottom of the cavity 20.

The rubber body 40 is inserted in the holding body 38 which is internally profiled generally according to the exterior shape of the rubber body, as most clearly seen in FIG. 6. In the holding member there is additionally provided two axial bores 56 and 58 outside the respective recesses 60 and 62 receiving the valve slot defining wall portions of the rubber body, and between each of these bores and the respective recess there is provided a further recess 64 and 66, respectively, the bores 56 and 58 and the recesses 64 and 66 being open at the top of the holding member, but closed at the bottom thereof.

In each of the bores 56 and 58 is mounted a rotatable shaft 68 and 70, respectively, these shafts filling out the bores adjacent the top and the bottom thereof, while along portions of their length they are shaped with an eccentric cross section of reduced diameter, these portions being designated 72. In each of the recesses 64 and 66 is mounted a plate member 74 having opposed parallel side edges, one cooperating with the eccentric portions of the respective shaft 68 or 70 and the other pressing against the exterior side of the respective valve slot defining wall portion of the rubber member adjacent the inner axial edge of the recess 64 and 66, respectively.

The width of the plate members 74 and the eccentricity of the shafts 68 and 70 are so adapted that by a rotation of the shafts through less than 180° the associated plate members 84 may be parallelly displaced between a closed position in which they press together the opposed walls of the valve slot defining portions of the rubber body and an open position in which they allow these opposed walls to be spaced maximally from each other, corresponding to full water flow from the respective inlet channel 42 or 44 to the outlet channel 46. In FIG. 6 these two extreme positions are shown in the right and left hand sides, respectively. It will be appreciated that by swinging the handle levers 12 and 14 any desired degree of opening of the respective valve slots will be obtainable, and that the edges of the valve slots 48 and 50 will be parallel to each other irrespective of the degree of opening of the respective slot.

In practice the result will be a mixing valve of relatively small dimensions and nevertheless a mixing valve which is practically noiseless due to the elongated valve slots and the large space in the outlet channel 46. Moreover the mixing valve is very easy to service because the said valve cartridge is easy to renew, and besides the cartridge is easy and cheap to manufacture, since it can be made entirely or almost entirely of rubber and plastics. It may be assembled in an easy and permanent manner, e.g. by welding or glueing, whereby it is not adapted to be repaired, but merely to be renewed.

Figure 9:
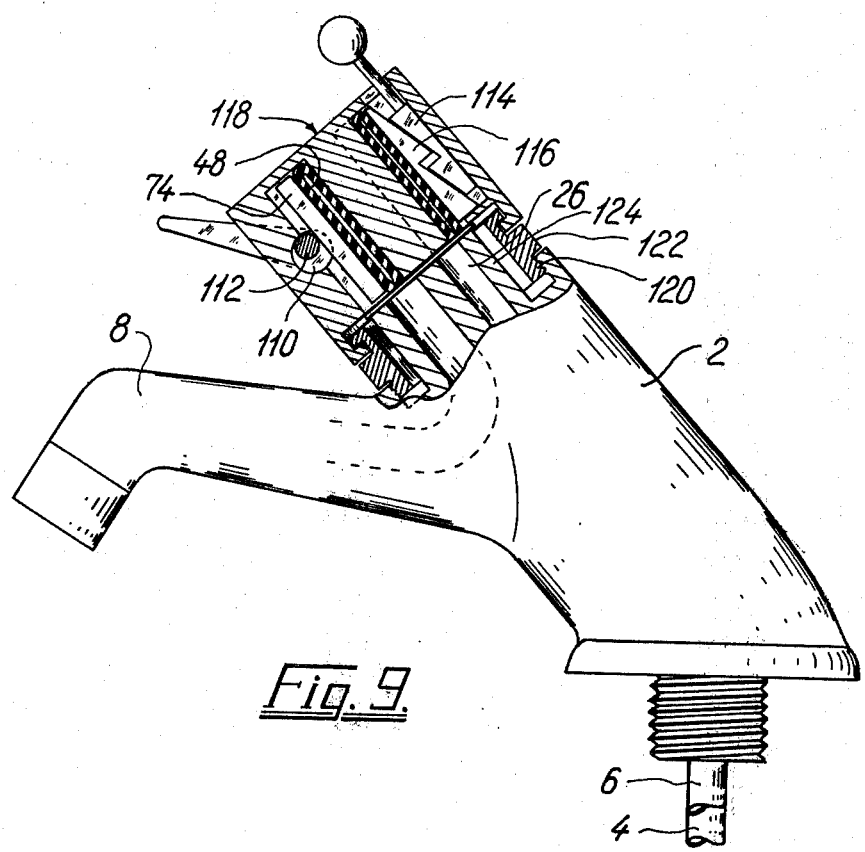
FIG. 9 is a schematic view illustrating further modifications.

Though it is a specific feature of the invention that the handles are mounted adjacent the top of the valve structure so as to project radially from the shafts of small mutual spacing, it would be possible to arrange the operation handles otherwise, e.g as shown in the left hand side of FIG. 9, on a shaft 110 extending crosswise of the rear edge of the associated pressing plate member 74 and having an eccentric portion 112 engaging the respective plate members or similar pressure transferring means. As shown in the right hand side of FIG. 9 the eccentric shafts 68 and 70 could even be substituted by conical or tapering members 114 cooperating with a correspondingly tapering rear edge of the pressure transfer plates 116, whereby the valve slots would be adjustable by an axial movement of the actuator means 114. Alternatively, as shown in FIG. 6A, actuator means may be provided so as to positively movable in the same direction as the pressure plates, e.g. as shown in dotted lines in FIG. 6 a screw spindle 80 having an outer handle 82 and extending through a threaded cross bore in the wall of the holding member so as to engage the rear edge of the pressure plate. In order to allow for an approximate parallel displacement of the pressure plate the spindle should engage the said rear edge thereof at an area midways between the ends of the strip formed pressure plate.

Figure 7:
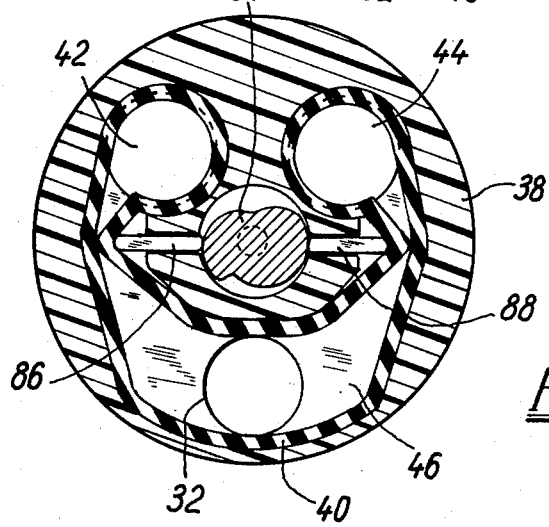
FIGS. 7 and 8 are similar views of modified embodiments.

As shown in FIG. 7 the two actuator shafts may be replaced by a single, central shaft 84 cooperating with pressure plate strips 86 and 88 acting upon interior wall portions of the valve slot defining portions of the rubber body. The shaft 84 is profiled in such a manner that when rotated anti-clockwise from the closed position shown it will first cause or allow the plate strip 86 to open its associated valve slot while holding the strip 88 closed, whereafter by further rotation it causes the strip 86 to be gradually moved towards its closed position and the strip 88 to move gradually towards its open position, whereby a constant flow mixing valve is obtained in which the mixing starts when the shaft has been rotated to open fully for the cold water. From other types of valves it is known that a combined conical and eccentric actuator rod may be used selectively for flow regualtion and mixing regulation depending on whether the rod is rotated or displaced axially, and it would be possible, of course, to make use of this principle also in connection with the valve according to the invention for providing for a single handle operation of the mixing valve.

Figure 8:
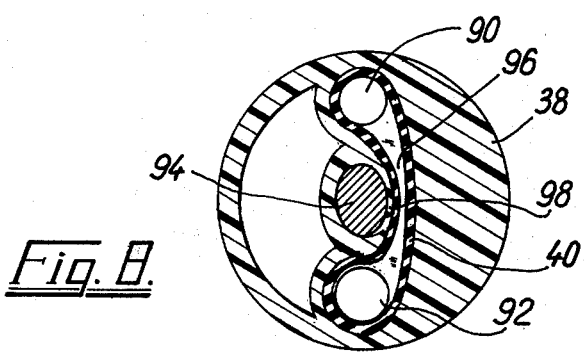

FIG. 8 illustrates a valve cartridge for use in a simple water tap, comprising one inlet channel 90 and one outlet channel 92 and a central, eccentric actuator shaft 94. The shaft transfers its pressing force to the valve slot defining portion 96 of the rubber body through a movable wall portion 98 of the holding member which is made of semi-rigid plastics.

For facilitating the production of the rubber body the valve slots are made so as to be open at their bottom ends. Adjacent these ends, however, the slots should preferably be permanently closed, and this may be obtained by forming the bottom side with protrusions 100 adjacent the slot ends, whereby these protrusions are clamped together when the cartridge is secured in the cavity 20. Proper orientation of the cartridge is ensured by means of a projection 102 on the bottom side of the holding member fitting into a corresponding hole in the bottom surface.

The valve means should not necessarily be included in a cartridge to be mounted inside an outer valve housing. As shown in FIG. 9 the valve means may be mounted inside a top portion 118 of the valve housing itself, this portion being secured to the base portion 2 of the valve housing by means of a threaded internal joining bushing 120 having a polygonal tightening flange 122. The top portion 118 constitutes the holding member of the elastomeric body, the lower flange portions of which are pressed against the top side of an internal post 124 through which the outlet and inlet channels extend. This construction may be preferable when — as in the example shown in the left hand side of the top portion — the valve actuator means extend outwardly from the cylindric wall of the valve means holding member.

Finally it should be mentioned that it is a separate specific feature of the invention that the two handles of a mixing valve are arranged generally as shown in FIG. 1, i.e. as outwardly projecting handle levers mounted adjacent the outer end of the valve housing and being swingable through less than 360° for operating the associated valve means, irrespective of the construction of the valve means. From an operation point of view it is very convenient to have the handles located adjacent the top of the upstanding exterior valve housing, above the outlet spout, and at the same time to have the handles separately accessible for finger tip operation. This manner of mounting the handles, of course, is facilitated by the special valve construction according to the primary aspect of the invention, since with this construction it is easy to arrange the two valve spindles relatively close to each other in a common valve housing. A further separate feature of the invention is the provision of an easily replaceable, complete valve cartridge constituting a mixing valve.

What is claimed is:

1. A regulating valve, such as especially a water tap or mixing valve, having two individual inlet passages, an outlet passage, and a valve passage for communicating each individual inlet passage with said outlet passage, the cross-sectional area of each of said valve passages being adjustable by means of a movable valve actuator means, characterized in that each valve passage is shaped as an elongated valve slot in a wall of each inlet passage, each of said valve slots extends generally in the axial direction of each inlet passage with each slot being formed between opposed edges which are operatively connected with the valve actuator means so as to be substantially parallely displaceable towards and away from each other.

2. A regulating valve according to claim 1, characterized in that said elastomeric member is a cylindrical member profiled so as to comprise parallel inlet and outlet passages, said passages being open at one end of the elastomeric member and at this end being provided with radially projecting sealing flange portions formed integrally with the elastomeric member, said passages being closed at the opposite end of the elastomeric member by means of an integral end wall portion, said elastomeric member is inserted in an internally correspondingly profiled holding body of a rigid or semi-rigid material, said flange portions of said elastomeric member resting against an end surface of said holding body in the inserted position of said elastomeric member, said movable valve actuator means being provided in said holding body an end of the holding body adjacent said closed end of the elastomeric member, said holding body and said elastomeric member forming a valve cartridge mountable in a valve housing with said sealing flange portions of said elastomeric member pressed against an internal wall portion of said valve housing and with the open ends of said inlet passages and said outlet passage communicating with corresponding inlet and outlet openings in said internal wall portion of the valve housing, the inlet and outlet openings are respectively connected with the inlet conduit and the outlet conduit.

3. A regulating valve according to claim 1, characterized in that said actuator means includes at least one eccentric rod disposed adjacent one of said valve slots, said eccentric rod being rotatable so as to open and close the associated valve slot in a graduated manner.

4. A regulating valve such as especially a water tap or mixing valve, having an inlet passage, an outlet passage, and a valve passage located therebetween, the cross-sectional area of said valve passage being adjustable by means of a movable valve actuator means, characterized in that the valve passage is shaped as an elongated valve slot in a wall of the inlet passage, said valve slot is closed at both ends and extends generally in the axial direction of the inlet passage and is formed between opposed edges which are operatively connected with the valve actuator means so as to be substantially parallely displaceable towards and away from each other, said inlet passage, said outlet passage, and said valve passage are provided in a unitary generally cylindrical elastomeric member which is profiled so as to dispose said inlet passage and said outlet passage in a parallel relationship, each of said inlet and outlet passages being open towards one end thereof for respective connection to an external inlet conduit and an outlet conduit, radially projecting sealing flange portions formed integrally with said elastomeric member at the open end thereof, an integral end wall portion is provided on said elastomeric member opposite said open end for closing said inlet passage and said outlet passage, a profiled holding body of a rigid or semi-rigid material is provided with said elastomeric member internally inserted therein, said flange portions of said elastomeric member resting against an end surface of said holding body in the inserted position of said elastomeric member, said movable valve actuation member being provided in said holding body and extending outwardly from an end of the holding body adjacent the closed end of said elastomeric member, said holding body and said elastomeric member forming a valve cartridge mountable in a valve housing with said sealing flange portions pressed against an internal wall portion of the valve housing and with the open ends of said inlet passage and said outlet passage communicating with corresponding inlet and outlet openings in said internal wall portion of said valve housing, the inlet and outlet openings are respectively connected with the inlet conduit and the outlet conduit, and in that the elastomeric member is provided with two parallel inlet passages, individual valve slots are provided for communicating each of said inlet passages with said outlet passage, said acutator means comprising elongated rod means operable to open and close the valve slots individually in a graduated manner.

5. A valve according to claim 4, characterized in that said rod means are constituted by two separate, eccentric shafts each extending in a channel in said holding member along the outside of the respective slot defining portions of the elastomeric member and being individually rotatable for closing and opening the respective slots.

6. A regulating valve such as especially a water tap or mixing valve, having an inlet passage, an outlet passage, and a valve passage located therebetween, the cross-sectional area of said valve passage being adjustable by means of a movable valve actuator means, characterized in that the valve passage is shaped as an elongated valve slot in a wall of the inlet passage, said valve slot is closed at both ends thereof and extends generally in the axial direction of the inlet passage and is formed between opposed edges which are operatively connected with the valve actuator means so as to be substantially parallely displaceable towards and away from each other, said inlet passage, said outlet passage, and said valve passage are provided in a unitary generally cylindrical elastomeric member profiled so as to dispose said inlet passage and said outlet passage in a parallel relationship, said inlet and outlet passages each being open towards one end thereof for a respective connection to an external inlet conduit and an outlet conduit, radially projecting sealing flange portions formed integrally with said cylindric member at the open end portion thereof, an integral end wall portion is provided on said cylindric member opposite said open end portion for closing said inlet passage and said outlet passage, a profiled holding body of a rigid or semi-rigid material is provided with said elastomeric member internally inserted therein, said flange portion of said elastomeric member resting against an end surface of said holding body in the inserted position of said cylindrical member, said movable valve actuating member being provided in said holding body and extending outwardly from an end of the holding body adjacent said closed end of the elastomeric member, said holding body and said elastomeric member forming a valve cartridge having a closed end which is mountable in a valve housing with said sealing flange portions being pressed against an internal wall portion of the valve housing and with the open ends of said inlet passage and said outlet passage communicating with corresponding inlet and outlet openings in said internal wall portion of said valve housing, the inlet and outlet openings are respectively connected with the inlet conduit and outlet conduit, and in that said elastomeric member is provided with two inlet passages, individual valve slots are provided for communicating each of said inlet passages with said outlet passages, the valve actuation means includes two shafts extending outside the closed end of said valve cartridge, said two shafts are provided with handle levers projecting radially outwardly from said shafts in respective directions, so as to be individually swingable for opening and closing the respective valve slots.

7. A valve according to claim 6, characterized in that said two shafts are eccentric shafts each of which extends in a channel in said holding body along the outside of a respective valve slot, said eccentric shafts being individually rotatable for closing and opening the respective valve slots.

8. A mixing valve of the type having a common valve housing and two individually operable handles for regulating the flow of cold and hot water from two water inlet conduits through individually operated valve means to a common outlet spout, each of said valve means includes a valve spindle operatively connected with a respective handle, the valve means being mounted inside the common valve housing, characterized in that the valve means are each of the type which is opened and closed by rotation at the associated valve spindle through less than 360°, preferably through 90°–180°, and in that the two valve spindles extend substantially parallel to each other and have their respective handles located in a common cross plane thereof, each handle being shaped as a handle lever projecting radially to one side of the associated spindle and having a length larger than the distance between the spindles, the handles are situated adjacent the upper or outer end of the valve housing which projects upwardly from a lower mounting base and has said common outlet spout located at an intermediate place between said mounting base and said handles.

9. A mixing valve according to claim 8, characterized in that the valve housing is shaped with an upper cavity in which a valve cartridge is releasably mountable, said cartridge including said valve means and said valve spindles and having inlet and outlet openings which in the mounted condition of the cartridge in said cavity communicate in a sealed manner with the respective openings of inlet and outlet channels in said valve housing.

10. A regulating valve such as especially a water tap or mixing valve, having two individual inlet passages, an outlet passage, and a valve passage located between each individual inlet passage and said outlet passage for communicating each individual inlet passage with said outlet passage the cross-sectional area of each of said valve passages being adjustable by means of a movable valve actuator means, characterized in that each valve passage is shaped as an elongated valve slot in a wall of a respective inlet passage, said valve slots being closed at both ends and extending generally in the axial direction of each inlet passage and being formed between opposed edges which are operatively connected with the valve actuator means so as to be substantially parallely displaceable towards and away from each other, said inlet passages, said outlet passage, and said valve passages are provided in a unitary elastomeric member, said elastomeric member is shaped in a generally cylindrical manner with a profiled cross-sectional shape defining said inlet passages and said outlet passages, each of said inlet and outlet passages being open towards one end thereof for a respective connection to an external inlet conduit and an outlet conduit, said elastomeric member being contained in a valve housing, said valve actuator means includes an elongated valve acutator member in said valve housing which is operable to move the respective edges of the respective valve slots toward or away from each other.

11. A regulating valve such as especially a water tap or mixing valve, having two parallel inlet passages, an outlet passage, and a valve passage located between each individual inlet passage and said outlet passage for communicating each individual inlet passage with said outlet passage, characterized in that each valve passage is shaped as an elongated valve slot, each of said valve slots being closed at both ends and extending generally in the axial direction of the inlet passage, each valve slot being operatively connected with the valve actuator means so as to be opened and closed thereby, said inlet passages, said outlet passage and said valve passages are provided in a generally cylindrical unitary elastomeric member profiled so as to dispose said inlet passages and said outlet passages in a parallel relationship, said inlet passages and said outlet passage each being opened towards one end thereof for respective connection to an external inlet conduit and an outlet conduit, radially projecting sealing flange portions formed integrally with said elastomeric member at the open end portion thereof, an integral end wall portion is provided on said elastomeric member opposite said open end for closing said inlet passages and said outlet passage, a profiled holding body of rigid or semi-rigid material is provided with said elastomeric member internally inserted therein, said flange portions of said elastomeric member resting against an end surface of said holding body in the inserted position of said elastomeric member, said movable valve actuator means being provided in said holding body and extending outwardly from an end of the holding body adjacent said closed end of said elastomeric member, said holding body and said elastomeric member forming a valve cartridge which is mountable in a valve housing with said sealing flange portions being pressed against an internal wall portion of the valve housing and with the open ends of said inlet passages and said outlet passage communicating with corresponding inlet and outlet openings in said internal wall portion of the valve housing, the inlet and outlet openings are respectively connected with the inlet and outlet conduits, said actuator means comprising an elongated eccentric rod extending in a channel in said holding body along the outside of said elastomeric member adjacent said valve slots, said rod being rotatable so as to be operable to open and close the valve slots individually in a graduated manner.

12. A regulating valve such as especially a water tap or mixing valve, having two parallel inlet passages, an outlet passage, and a valve passage located between each individual inlet passage and said outlet passage for communicating each individual inlet passage with said outlet passage, a cross-sectional area of each of said valve passages being adjustable by means of a movable valve acutator means, characterized in that each valve passage is shaped as an elongated valve slot, said valve slots being closed at both ends and extending generally in the axial direction of the inlet passages, said valve slots being operatively connected with the valve actuator means so as to be opened and closed thereby, said inlet passages, said outlet passage, and said valve passages are provided in a unitary generally cylindrical elastomeric member profiled so as to dispose said inlet passages and said outlet passage in a parallel relationship, said inlet passages and said outlet passage each being open towards one end thereof for respective connection to an external inlet conduit and an outlet conduit, radially projecting sealing flange portions formed integrally with said elastomeric member at the open end portion thereof, an integral end wall portion is provided on said elastomeric member opposite the open end for closing said inlet passages and said outlet passage, a profiled holding body of rigid or semi-rigid material is provided with said elastomeric member internally inserted therein, said flange portions of said elastomeric member resting against an end surface of said holding body in the inserted position of said cylindrical member, said movable valve actuator means being provided in said holding body and extending outwardly from an end of the holding body adjacent said closed end of the elastomeric member, said holding body and said elastomeric member forming a valve cartridge which is mountable in a valve housing with said sealing flange portions being pressed against an internal wall portion of the valve housing and with the open ends of said inlet passage and said outlet passage communicating with corresponding inlet and outlet openings in said internal wall portion of the valve housing, the inlet and outlet openings are respectively connected with the inlet conduit and outlet conduit, said actuator means comprising an elongated eccentric actuator rod disposed outside of said elastomeric member adjacent said valve slot, pressure transfer means are interposed between said eccentric actuator rod and said valve slots, said pressure transfer means being guided in a passage provided in said holding body, said elongated eccentric actuator rod coacting with said pressure transfer means so as to open and close the valve slots individually in a graduated manner.

* * * * *